United States Patent
Ono et al.

(10) Patent No.: US 7,085,465 B2
(45) Date of Patent: Aug. 1, 2006

(54) OPTICAL FIBER AND METHOD OF MEASURING COEFFICIENT OF KINETIC FRICTION OF OPTICAL FIBER

(75) Inventors: Takayoshi Ono, Tokyo (JP); Koji Mochizuki, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 178 days.

(21) Appl. No.: 10/423,049

(22) Filed: Apr. 25, 2003

(65) Prior Publication Data

US 2004/0013383 A1  Jan. 22, 2004

(30) Foreign Application Priority Data

Apr. 30, 2002 (JP) ............................. 2002-129430

(51) Int. Cl.
*G02B 6/00* (2006.01)

(52) U.S. Cl. ............................. 385/128; 73/9

(58) Field of Classification Search ................ 385/128, 385/100; 73/9
See application file for complete search history.

(56) References Cited

U.S. PATENT DOCUMENTS

| | | | |
|---|---|---|---|
| 5,561,730 A * | 10/1996 | Lochkovic et al. ......... | 385/114 |
| 6,048,911 A * | 4/2000 | Shustack et al. .............. | 522/96 |
| 6,362,249 B1 * | 3/2002 | Chawla ...................... | 522/182 |
| 6,584,263 B1 * | 6/2003 | Fewkes et al. .............. | 385/128 |
| 6,775,451 B1 * | 8/2004 | Botelho et al. ............. | 385/128 |

FOREIGN PATENT DOCUMENTS

JP    11-194071    7/1999

* cited by examiner

*Primary Examiner*—Sung Pak
*Assistant Examiner*—Mike Stahl
(74) *Attorney, Agent, or Firm*—Eric J. Robinson; Robinson Intelllectual Property Law Office, P.C.

(57) ABSTRACT

An optical fiber of the present invention comprising a bare optical fiber and one or plural coating layers on the bare optical fiber, wherein Y, the Young's modulus of the outermost coating layer is in the range of 400 to 1000 and μ, a coefficient of kinetic friction which occurs between the outermost coating layers is equal to or larger than 0.15, and further satisfying the following formulas (a) and (b);

$$\mu \leq -0.9822 \text{ Log } Y + 3.45156 \quad \text{(a)}$$

$$\mu \geq -0.5418 \text{ Log } Y + 1.74128, \quad \text{(b)}$$

wherein the unit of Y is MPa.

By the present invention, optical fibers with a low rate of occurrences of the attenuation discontinuity in a measurement result by OTDR and the method of measuring the coefficient of kinetic friction of optical fiber with high reliability are offered.

9 Claims, 5 Drawing Sheets

OPTICAL FIBER AND METHOD OF MEASURING COEFFICIENT OF KINETIC FRICTION OF OPTICAL FIBER

FIELD OF THE INVENTION

This invention concerns with an optical fiber with a low rate of occurrence of the attenuation discontinuity in a measurement result by OTDR (Optical Time Domain Reflectometer) and a method of measuring the coefficient of kinetic friction of the optical fiber with high reliability.

BACKGROUND OF THE INVENTION

In general, the structure of optical fiber consists of two coating layers of resin composition on the surface of a bare optical fiber.

Usually, a flexible coating material, called a soft material, is used to form the first coating layer and a high rigid coating material, called a hard material, is used to form the second coating layer.

The ultraviolet curable resin (hereafter, the UV resin), of which the principal ingredient is the oligomer of the urethane acrylate or/and the epoxy acrylate, is adopted as the resin composition of the coating layer from the viewpoint of the curing rate.

An optical fiber is manufactured by coating such an UV resin liquid on the surface of a bare optical fiber, and curing it by irradiating ultraviolet rays continuously during drawing.

In this optical fiber, the degree of stickiness on the surface of the outermost coating layer is called a tack of surface. This tack of surface is an important factor that influences the ease of handling and manufacturing in the post-processing, and it is necessary to suppress it to be low.

In a usual optical fiber, the second coating layer becomes the outermost coating layer.

An optical fiber wound round the bobbin after drawing is rewound up to the shipment bobbin, and is cut by the predetermined length. This process is called rewind process.

Next, a wound optical fiber is passed to the inspection process, and the transmission loss is measured. OTDR is usually used to measure this transmission loss in which, an optical pulse is launched into the optical fiber and the backscattered light which is reflected from each point in the longitudinal direction of the optical fiber is measured on the axis of time.

Figure 5:
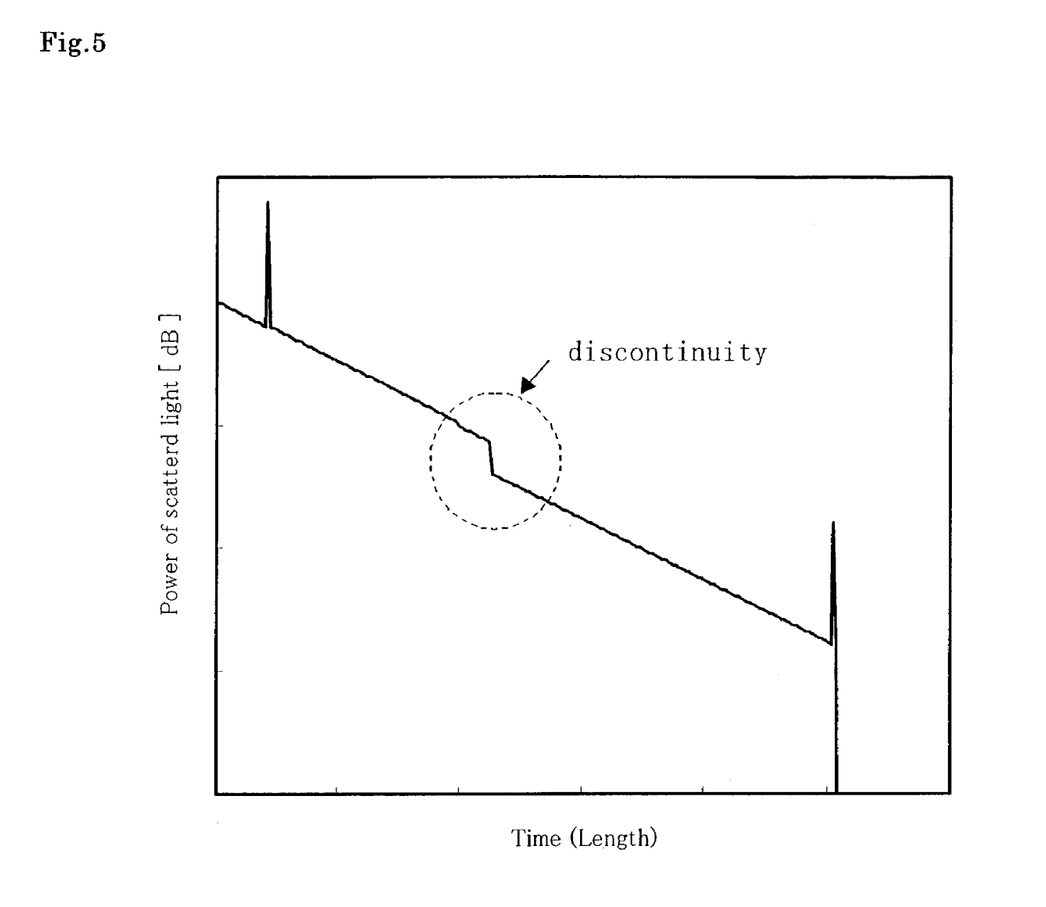
FIG. 5 is an example of the attenuation curve of the optical power obtained from the measurement by OTDR.

As a measurement result by OTDR, attenuation curve of optical power, of which the vertical axis shows the optical power level and the horizontal axis shows time (length), is obtained as shown in FIG. 5. The transmission loss over the total length of the optical fiber is measured from this attenuation curve.

In this attenuation curve, the loss variation like the step is called discontinuity (refer to FIG. 5).

Such a discontinuity mostly disappears by rewinding it several-times. However, when every time the discontinuity is generated, the OTDR measurement has to be done again and again which increases the workload of the rewind process and it becomes a problem.

Especially, when the tack of the surface of the optical fiber is high, the discontinuity originating from it occurs, and the rate of occurrence of the discontinuity becomes high.

The method of manufacturing of the optical fiber that reduces the tack of surface is proposed in "JP patent No. 2614949", for instance, in which the curing is done by the ultraviolet rays irradiation, under the atmosphere of 1% or less of oxygen concentration.

The patent shown above is related to the prevention technique of the increase of the tack, which is occurred by that the radical initiator cleaved by the UV rays irradiation is trapped by the oxygen and the resin of the optical fiber coating surface is insufficient curing condition.

Moreover, decreasing of the rate of occurrence of the discontinuity is tried by lowering the coefficient of kinetic friction on the surface of the outermost coating layer of optical fiber (hereafter, the coefficient of kinetic friction of the optical fiber).

When the coefficient of kinetic friction of the optical fiber is high, it will cause the generation of discontinuity, because the loss increases by microbending, the taking up and paying out to the bobbin become difficult, and/or the damage in coating layer of optical fiber occurs, in extreme case, by generation of kinetic friction force between optical fibers and also between an optical fiber and a bobbin.

JIS K7125 provides the general measurement method of a coefficient of kinetic friction by using the film formed with the same quality as the measured material. However, when the coefficient of kinetic friction of optical fiber is measured by the method of the above-mentioned JIS, the variations in the measurement results are extremely large, and it is difficult to obtain a reliable value.

The method of measuring the coefficient of kinetic friction in the colored optical fiber, overcoming this problem, is indicated in "Japan Laid-Open Patent Application (JP-A; KOUKAI) No. Hey11-194071". (The colored optical fiber is the one in which the UV resin that includes pigment was covered on the above-mentioned optical fiber).

In this method, one optical fiber is fixed on a horizontal fixed table, and the other is fixed on the bottom of a sled substantially in parallel with the former one. The sled is loaded on the fixed table so that each optical fiber cross right-angled, and they contact. The kinetic frictional force caused by the movement of the sled is measured.

SUMMARY OF THE INVENTION

Up to now, for the decrease of the rate of occurrence of the discontinuity, the improvement of the tack of surface of optical fiber and the decrease of the coefficient of kinetic friction etc. are tried but an sufficient solution has not been performed.

The present invention aims to solve the above-mentioned problem, and to offer a method of measuring the coefficient of kinetic friction of optical fiber where the variations are small and reliability is high and an optical fiber with a low rate of occurrence of the discontinuity using the above-mentioned method measuring the coefficient of kinetic friction. The workload in the rewind process can be reduced by this invention.

The inventors keenly examined to solve the above-mentioned problem and found that the rate of the discontinuity is dependent on the Young's modulus of the outermost coating layer in addition to the coefficient of kinetic friction of the optical fiber. By setting these to a specific relation, the inventors were able to find a solution to the above-mentioned problem.

Moreover, we found that it is possible to measure highly reliable values of coefficient of kinetic friction of optical fiber by measuring the kinetic frictional force when we make the following method. That is, at first, two optical fibers are fixed parallel to each other on the horizontal fixed table and on the bottom of the sled, then the sled is loaded on the fixed table so that each optical fiber cross right-angled and contact. And, when the sled is loaded, the weight of the sled and the tensile speed of moving the sled are limited to a certain value.

An optical fiber according to the present invention comprises a bare optical fiber and one or plural coating layers on the bare optical fiber, wherein Y, the Young's modulus of the outermost layer is in the range of 400 to 1000 and μ, a coefficient of kinetic friction of the outermost layers is equal to or larger than 0.15, and further satisfying the following formulas (a) and (b);

$$\mu \leq -0.9822 \log Y + 3.45156 \quad (a)$$

$$\mu \geq -0.5418 \log Y + 1.74128 \quad (b),$$

wherein the unit of Y is MPa.

In a preferred embodiment, μ further satisfies the following formula (c);

$$\mu \leq -0.5418 \log Y + 1.85912 \quad (c),$$

Coefficient of kinetic friction μ is a value here measured by following the method of present invention of measuring the coefficient of kinetic friction of the optical fiber.

The bare optical fiber is a silica-based optical fiber the diameter of which is 125 μm±5 μm. The first coating layer has Young's modulus equal to or less than 2 MPa.

Moreover, in the measuring method of the coefficient of kinetic friction of optical fiber of the present invention mentioned above, a weight of the sled along with the optical fiber fixed to bottom of sled is more than 60 gf and less than 110 gf, and tensile speed of moving the sled is more than 100 mm/min and less than 500 mm/min.

DESCRIPTION OF THE PREFERRED EMBODIMENTS

Though there is especially no limitation in the kind of the optical fiber used by this invention, a silica-based single-mode, a silica-based multi-mode, multi-component system, the polycarbonate system, and the polycarbonate cladding system, etc. are enumerated.

The UV resins used for the first coating layer, the second coating layer and the outermost coating layer (usually, the second coating layer is the outermost coating layer) are not especially limited, though, the resin composition like the principal ingredient of radical polymerizable oligomer (I), mixed with a necessary amount of reactive monomer (II), and polymerization initiator (III), are used with or without various additives (IV), etc, for instance.

As a radical polymerizable oligomer (I), the compound that has polymerizable unsaturated groups of the vinyl group or the (meth)acryl group, etc. in both the ends is enumerated. For example, it contains urethane acrylate, which is the resin synthesized from polyol (IA), polyisocyanate (IB) and the compound (IC) containing the polymerizable unsaturated group and the hydroxyl group, or epoxy acrylate formed as the reaction product of the carboxylic acid containing polymerizable unsaturated groups such as the glycidylether compound and (meth)acrylate etc., etc. These polymeric oligomers (I) can be obtained as a commercial item.

The number of average molecular weight of this radical polymerizable oligomer (I) prepared as the first coating is 2000–10000, and more appropraitely, is 3000–6000. And, that of the second coating or outermost coating is 800–4000, and more appropraitely is 1000–3000.

The following are enumerated as above-mentioned polyol (IA) used to manufacture the urethane acrylate.

(1) Polyalkyleneoxide like polyethyleneoxide, polypropyleneoxide, polybuteneoxide, or polyoxides of similar kinds.

(2) Polymer of cyclic ether of tetrahydrofuran and alkyl substituent tetrahydrofuran, or similar kinds.

(3) Polyether polyol consisting more than two types of copolymers of (1) and/or (2)

(4) Polybutadiene polyol (5) Hydrogenerated polybutadiene polyol (6) Polyester polyol like Polycondensation compound of polybasic acid and polyol (7) Polyester polyol which is obtained by ring-opening polymerization in lactone of the γ-valerolactone and ε-caprolactone, etc.

Moreover, the following are enumerated as above-mentioned polyisocyanate (IB).

2,4-tolylene diisocyanate, 2,6-tolylene diisocyanate, 4,4'-diphenylmethane diisocyanate, hydrogenerated 4,4'-diphenylmethane diisocyanate, 1,3-xylylene diisocyanate, 1,4-xylylene diisocyanate, hydrogenerated 1,3-xylylene diisocyanate, 1,6-hexamethylene diisocyanate, isophorone diisocyanate, 1,5-naphthalene diisocyanate, p-phenylene diisocyanate, 1,4-cyclohexane diisocyanate, lysine diisocyanate, tetramethylxylylene diisocyanate, lysine ester triisocyanate, 1,6,11-triisocyanateundecane, 1,8-diisocyanate-4-isocyanatemethyloctane, 1,3,6-triisocyanatehexane, 2-(3-isocyanatepropyl)-2,5-di(isocyanatemethyl)-bicyclo(2.2.1)heptane, trimethylhexamethylene diisocyanate, norbornene diisocyanate, etc.

In addition, the following for instance are enumerated as compound (IC), which has the polymerizable unsaturated group and the hydroxyl group in the end, used to manufacture above-mentioned urethane acrylate.

2-hydroxyethyl(meth)acrylate, 2-hydroxypropyl(meth)acrylate, 2-hydroxy-3-phenyloxypropyl(meth)acrylate, 2-(meth)acryloyloxyethy-2-hydroxyethyl phthalate, pentaerythritol tri(meth)acrylate, 3-acryloyl oxyglycerin mono(meth)acrylate, 2-hydroxybutyl(meth)acrylate, 2-hydroxy-1-(meth)acrylate, glycerin di(meth)acrylate, polypropyleneglycol mono(meth)acrylate, polyethyleneglycol mono(meth)acrylate, poly ε-caprolacton mono(meth)acrylate, 4-hydroxybuthyl mono(meth)acrylate, ε-caprolacton mono(meth)acrylate, etc.

The following are enumerated as the above-mentioned epoxy acrylate.

Reaction product of (1) and (2) or reaction product of (1) and (3) wherein (1), (2) and (3) are the following.
(1) Bisphenols; bisphenol A, bisphenol S, bisphenol F, or similar kinds.
(2) Glycidylether of polyol containing aromatic ring such as phenolic resins or similar kinds.
(3) (Meth)acrylate The above-mentioned radical polymerizable oligomer is used either alone or by mixing plural numbers.

Next, the following structural compound containing the hydroxyl group combined with (meth)acrylate by the esterification reaction etc., are enumerated as reactive monomer (II), for instance.

Mono functional diluent;
methoxyetheleneglycol(meth)acrylate, methoxypolyetheleneglycol(meth)acrylate, β-(meth)acryloyl oxypropylhydrogen phthalate, β-(meth)acryloyl oxypropylhydrogen succinate, nonyl phenoxy ethyl(meth)acrylate, 3-chloro-2-hydroxypropyl(meth)acrylate, phenoxy ethyl(meth)acrylate, phenoxy polyethyleneglycol(meth)acrylate, nonyl phenoxy polyethyleneglycol(meth)acrylate, nonyl phenoxy polypropyleneglycol(meth)acrylate, methoxypolyetheleneglycol(meth)acrylate, β-(meth)acryloyl oxypropylhydrogen phthalate, β-(meth)acryloyl oxypropylhydrogen succinate, butoxy polyethyleneglycol(meth)acrylate, alkyl(meth)acrylate, cyclohexyl(meth)acrylate, tetrahydrofurfuryl(meth)acrylate, isobornyl(meth)acrylate, benzyl(meth)acrylate, 2-hydroxyethyl(meth)acrylate, 2-hydroxypropyl(meth)acrylate, 2-hydroxy-3-phenyloxypropyl(meth)acrylate, 2-(meth)acryloyloxyethy-2-hydroxyethyl phthalate, 3-acryloyl oxyglycerin mono (meth)acrylate, 2-hydroxybutyl(meth)acrylate, 2-hydroxy-1-(meth)acryloxy-3-(meth)acryloxyepropane, polypropyleneglycol-mono(meth)acrylate, polyethyleneglycol mono(meth)acrylate, poly ε-caprolacton mono (meth)acrylate, dialkyl aminoethyl(meth)acrylate, glycidyl(meth)acrylate, mono[2-(meth)acryloyloxyethyl] acid phosphate, trifluoroethyl(meth)acrylate, 2,2,3,3,-tetrafluoropropyl(meth)acrylate, 2,2,3,4,4,4,-hexafluorobuthyl(meth)acrylate, dicyclopentenyloxyalkyl (meth)acrylate, dicyclopentenyl(meth)acrylate, tricyclodecanyl(meth)acrylate, tricyclodecanyloxyethyl (meth)acrylate, isobornyl oxyethyl(meth)acrylate, n-vinyl pyrrolidone, n-vinyl pyridine, morpholine(meth)acrylate, n-vinyl caprolactam, etc.

Di functional diluent;
Di(meth)acrylate of
2,2-dimethyl-3-hydroxypropyl-2,2-dimethyl-3-hydroxypropionate, ethyleneglycol di(meth)acrylate, polyethyleneglycol di(meth)acrylate, propyleneglycol di(meth)acrylate, polypropylene glycol di(meth)acrylate, 1,4-butanediol di(meth)acrylate, 1,6-hexanediol di(meth)acrylate, glycerin di(meth)acrylate, neopenthylglycol di(meth)acrylate, di(meth)acrylate of hydroxypivalic acid neopenthylglycol, di(meth)acrylate of bisphenol A ethyleneoxide addition compound, di(meth)acrylate of bisphenol A propyleneoxide addition compound, di(meth)acrylate of 2,2'-di (hydroxypropoxyphenyl), propane, di(meth)acrylate of 2,2'-di(hydroxyethoxyphenyl)propane, di(meth)acrylate_of tricyclodecane dimethylol, etc.

Poly functional diluent;
trimethylolpropane tri(meth)acrylate, pentaerythritol tri (meth)acrylate, pentaelythritol tetra(meth)acrylate, dipentaelythritol hexa(meth)acrylate, tetramethylolmetane tri (meth)acrylate, tetramethylolmetane tetra(meth)acrylate, tri(meth)acrylate of tris(2-hydroxyethyl)isocyanurate, tri (meth)acrylate of tris(hydroxypropyl)isocyanurate, triallyl trimellitate, triallyl isocyanurate, etc.

When nonyl phenoxy polypropyleneglycol(meth)acrylate (ARONIX M-113 of the TOAGOSEI CO., LTD. etc.) is used as the first coating layer, it has the action of lowering the glass-transition temperature (Tg) after curing. When the monomer that has rigid frames such as isobornyl acrylate etc, is used with the above-mentioned low Tg monomer, it has the action of improving the adhesion between the glass and the first coating by the sticking mechanism. The monomer of n-vinylamide like n-vinyl pyrrolidone etc. has the action that hastens the rate of polymerization of acrylate by being mixed with a reactive system of acrylate.

Di(poly)functional monomer is used for adjusting the molecular weight between cross-link points, and there is an action that decreases the molecular weight between cross-link points and increases the Young's modulus after curing.

The types of radical polymerizable oligomer (I) and reactive monomer (II) used for a reactionary chosen and the amount of the combination is adjusted to achieve the characteristics such as the curing rate, the Young's modulus, and the adhesion between the glass and the first coating etc. required to form the first coating layer and the curing rate and the Young's modulus, etc. required to form the outermost coating layer.

The following are enumerated as polymerization initiator (III), for instance.

4-dimethylamino benzoic acid, 4-dimethylamino benzoate, alkoxy acetophenone, benzyl dimethyl ketal, benzophenone and benzophenone derivative, benzoin derivative, bis(4-dialkylaminophenyl)ketone, benzyl and benzyl derivative, benzoin and benzoin derivative, 2-hydroxy-2-methylpropiophenone, 1-hydroxycyclohexyl phenylketone, thioxanthone and thioxanthone derivative, 2,4,6-trimethylbenzoyldiphenylphosphine oxide, 2-methyl-1-[4-(methyltio)phenyl]-2-morphorinopropane-1-on, 2-bennzyl-2-dimethylamino-1-(4-morphorinophenyl)butanone-1, bis(2,6-dimethoxybenzoyl)-2,4,4-trimethylpentaphospineoxide, bis(2,4,6-trimethylbenzoyl)-phenylpho sphineoxide), etc.

The amount of use of the polymerization initiator (III) is not especially different from the amount used by the common procedure.

The following are enumerated as an example of various additives (IV). Pigments, colorant, ultraviolet(UV) absorber, photo-stabilizer, sensitizer, chain transfer agent, polymerization inhibitor, silane coupling agent, leveling agent, lubricant, antioxidant, weather resistant agent, preservative, plasticizer, and surface active agent, etc.

Especially, the silicone surface improver is suitably used for the purpose to decrease the coefficient of friction of the after curing UV resin. Moreover, the Young's modulus of the after curing UV resin is adjusted by changing the molecular weight of radical polymerizable oligomer (I), especially molecular weight in polyol (IA) part, and selecting the type of reactive monomer (II).

Since a first coating layer aims at a buffer function, flexibility is required for it, and as UV resin for the first coating layer, the coatings having Young's modulus of 2 MPa or less after curing can be used suitably. It is 1 MPa or less, more preferably.

The UV resin which makes a low Young's modulus is obtained by enlarging the molecular weight of a radical polymerizable oligomer (I) within the limits of the above-mentioned, or by selecting mono functional type with large molecular weight and having the straight chain as reactive monomer (II), for instance.

Accordingly, the number of average molecular weight of this radical polymerizable oligomer (I) is 2000–10000, and more appropriately, is 3000–6000. Nonyl phenoxy polyethyleneglycol(meth)acrylate (ARONIX M-113 of the TOAGOSEI CO., LTD. etc.), the isobornyl acrylate, and n-vinyl caprolactam, etc. are desirable as reactive monomer (II) among the above-mentioned.

400–1000 MPa of the Young's modulus of the outermost coating layer is suitable.

When it is less than 400 MPa, the microbending cannot be secured, since the rigidity and hardness are insufficient and since it is easy for the damages to attach to the surface of the optical fiber, the commercial value is decreased.

On the other hand, when 1000 MPa is exceeded, the rigidity is too high, the bending loss occurs, and it becomes weak. Moreover, the crack occurs easily on the surfaces of the optical fiber by the impact from the outside, and, according to circumstances, the outermost coating layer is flaked off.

The method of achieving a high Young's modulus includes the following methods, for instance.

The molecular weight of radical polymerizable oligomer (I) is reduced within the above-mentioned range, polyisocyanate (IB) is selected as the rigid structural material, reactive monomer (II) is selected as the material with a higher rigidity, or the amount of mixing of poly functional type is increased.

Accordingly, the number of average molecular weight of this radical polymerizable oligomer (I) is 800–4000, and more appropriately, is 1000–3000. The following are desirable as reactive monomer (II) among the above-mentioned. di(meth)acrylate of tricyclodecane dimethylol, di(meth)acrylate of bisphenol A ethyleneoxide addition compound, pentaelythritol tetra(meth)acrylate, 1,6-hexanediol di(meth)acrylate, etc.

Moreover, the coefficient of friction desirable is 0.15 or more, because if it is less than this value, it becomes easy to generate the rolling collapse in the rewind process or after the rewind.

Next, it is explained more in detail of executing the present invention based on the example.

EXAMPLE

First of all, the following UV resins 1–10 were made as the resin of coating layers. That is, the above-mentioned radical polymerizable oligomer (I) was reacted, under the existence of a reactive monomer and a polymerization initiator, with or without the addition of surface improver, and UV resins 1–10 were prepared, as shown in the following table 1.

The Young's modulus of the resin after curing was measured on a 0.2 mm thickness film formed by curing the resin in the atmosphere under the condition of UV illuminant of 200 mW/cm$^2$ and UV dose of 1000 mJ/cm$^2$, by tensile test under the condition of 23° C. and tensile rate of 1 mm/min, and was calculated from the tensile strength at 2.5% distortion.

TABLE 1

| | | | UV coatings | | | | | | | | | |
|---|---|---|---|---|---|---|---|---|---|---|---|---|
| | | | 1 | 2 | 3 | 4 | 5 | 6 | 7 | 8 | 9 | 10 |
| component (weught ratio) | radical polymerizable oligomer | I-1 | 55 | | | | | | | | | |
| | | I-2 | | 45 | 45 | 45 | | | | | | |
| | | I-3 | | | | | 40 | 40 | | | | |
| | | I-4 | | | | | 15 | 15 | | | | |
| | | I-5 | | | | | | | 45 | | | |
| | | I-6 | | | | | | | | 65 | 65 | 65 |
| | reactive monomer | II-1 | 15 | | | | | | | | | |
| | | II-2 | 20 | 25 | 25 | 25 | 10 | 10 | 10 | | | |
| | | II-3 | 8 | | | | | | 16 | | | |
| | | II-4 | | 10 | 10 | 10 | 10 | 10 | | | | |
| | | II-5 | | 18 | 18 | 18 | 15 | 15 | | | | |
| | | II-6 | | | | | 8 | 8 | | | | |
| | | II-7 | | | | | | | 25 | | | |
| | | II-8 | | | | | | | | 30 | 30 | 30 |
| | polymerization initiator | III-1 | 2 | 1.5 | 1.5 | 1.5 | 1.5 | 1.5 | | | | |
| | | III-2 | | 0.5 | 0.5 | 0.5 | 0.5 | 0.5 | | | | |
| | | III-3 | | | | | | | 4 | | | |
| | | III-4 | | | | | | | | 5 | 5 | 5 |
| | surface improver | IV-1 | | | 0.1 | 0.3 | | 0.1 | | | 0.1 | 0.3 |

TABLE 1-continued

|  |  | UV coatings | | | | | | | | | |
|---|---|---|---|---|---|---|---|---|---|---|---|
|  |  | 1 | 2 | 3 | 4 | 5 | 6 | 7 | 8 | 9 | 10 |
| property | Young's modulus (MPa) 0.2 mm thick cured film | 1.0 | 780 | 700 | 670 | 740 | 730 | 590 | 550 | 540 | 530 |

I-1 PPG-TDI-HEA
I-2 (BO-EO)-TDI-HEA
I-3 (PTMG-mePTMG)-TDI-HEA
I-4 bisphenol-TDI-HEA
I-5 PPG-TDI-HEA
I-6 PTMG-IPDI-HEA
II-1 Nonylphenol EO degeneration acrylate (made by Toagosei; brand name Aronix M-113)
II-2 isobornyl acrylate
II-3 N-vinyl caprolactam
II-4 N-vinyl pyrrolidone
II-5 tricyclodecane dimethylol diacrylate (made by Mitsubishi Chemistry; brand name YUPIMER UV-SA-1002)
II-6 EO degeneration bisphenol A diacrylate (made by New Nakamura Chemistry and; brand name ABPE-4)
II-7 Pentaerythritol Tori acrylate (made by Toagosei; brand name M305)
II-8 1,6-hexanediol diacrylate (made by New Nakamura chemistry; brand name A-HD)
III-1 2,4,6-trimethylbenzoyldiphenylphosphine oxide (madeby BASF; brand name Lucirin TPO)
III-2 2-methyl-1-[4-(methyltio) phenyl]-2-morphorinopropane-1-on (made by Ciba-Geigy; brand name Irgacure907)
III-3 benzyl dimethyl ketal (made by Ciba-Geigy; brand name Irgacure651)
III-4 1-hydroxycyclohexyl phenylketone (made by Ciba-Geigy; brand name Irgacure 184)
IV-1 Silicone surface reforming medicine (made by Toray Dow Corning Silicone; brand name SH200)

[UV Resin 1]

The polyether urethane acrylate (numerical mean molecular weight 5000) synthesized from polypropylene glycol 500 g (numerical mean molecular weight 2000), 2,4-tolylene diisocyanate 60 g, and 2-hydroxyethyl acrylate 30 g is assumed to be the above-mentioned polymeric oligomer (I), and it is made to react with the reactive monomer (II), forming the UV resin 1, the Young's modulus of which is adjusted to be 1.0 MPa.

[UV Resin 2]

The polyether urethane acrylate (numerical mean molecular weight 1500) synthesized from polyetherpolyol copolymer 500 g (numerical mean molecular weight 1000) of polyethyleneoxide and polybutadieneoxide, 2,4-tolylene diisocyanate 176 g, and 2-hydroxyethyl acrylate 118 g is assumed to be polymeric oligomer (I), and it is made to react with reactive monomer (II), forming the UV resin 2 the Young's modulus of which is adjusted to be 780 MPa.

[UV Resin 3]

0.1 weight percentage of the silicone surface improver added to 100 weight percentage of UV resin 2 forms the UV resin 3, the Young's modulus of which is adjusted to 700 MPa.

[UV Resin 4]

0.3 weight percentage of the silicone surface improver added to 100 weight percentage of UV resin 2 forms the UV resin 3, the Young's modulus of which is adjusted to 670 MPa.

[UV Resin 5]

40 weight percentage of polyether urethane acrylate (numerical mean molecular weight 2500) synthesized from polyetherpolyol copolymer 500 g (numerical mean molecular weight 2000) of tetrahydrofuran and 2(3)-methyltetrahydrofuran, 2,4-tolylene diisocyanate 88 g and 2-hydroxyethyl acrylate 59 g and 15 weight percentage of polyether urethane acrylate (numerical mean molecular weight 1300) synthesized from bisphenol A ethyleneoxide addition compound (one of OH group of bisphenol A are $OCH_2 CH_2 OH$) 100 g (numerical mean molecular weight 272), 2,4-tolylene diisocyanate 96 g, and 2-hydroxyethyl acrylate 43 g are assumed to be polymeric oligomer (I), and are made to react with reactive monomer (II) forming UV resin 5, the Young's modulus of which is adjusted to be 740 MPa.

[UV Resin 6]

0.1 weight percentage of the silicone surface improver added to 100 weight percentage of UV resin 5 forms the UV resin 6, the Young's modulus of which is adjusted to 730 MPa.

[UV Resin 7]

The polyether urethane acrylate (numerical mean molecular weight 1500) synthesized from polypropylene glycol 500 g (numerical mean molecular weight 1000), 2,4-tolylene diisocyanate 176 g, and 2-hydroxyethyl acrylate 118 g is assumed to be above-mentioned polymeric oligomer (I), and is made to react with reactive monomer (II) forming UV resin 7, the Young's modulus of which is adjusted to be 590 MPa.

[UV Resin 8]

The polyether urethane acrylate (numerical mean molecular weight 1500) synthesized from polyesterpolyol copolymer 500 g of polytetramethyleneglycol, adipic acid, 1,6-hexanediol (numerical mean molecular weight 850), isophorone diisocyanate 246 g, and 2-hydroxyethyl acrylate 137 g is assumed to be above-mentioned polymeric oligomer (I), and is made to react with reactive monomer (II), forming the UV resin 8, the Young's modulus of which is adjusted to be 550 MPa.

[UV Resin 9]

0.1 weight percentage of the silicone surface improver added to 100 weight percentage of UV resin 8 forms the UV resin 9, the Young's modulus of which is adjusted to 540 MPa.

[UV Resin 10]

0.3 weight percentage of the silicone surface improver added to 100 weight percentage of UV resin 8 forms the UV resin 10, the Young's modulus of which is adjusted to 530 MPa.

[Manufacturing of Optical Fiber]

TABLE 2

| | Execution example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| The first coating layer resin composition | UV resin 1 | | | | | | | | | | | |
| The second coating layer resin composition | UV resin 2 | | UV resin 3 | | UV resin 5 | UV resin 6 | UV resin 7 | UV resin 8 | | | UV resin 9 | |
| Oxygen concentration of curing the second coating layer (%) | 1 | 0.5 | 0.05 | 0.8 | 0.1 | 0.8 | 0.8 | 0.6 | 0.6 | 0.8 | 0.1 | 0.8 |
| Drawing speed (m/min) | 1000 | 500 | 1500 | 1200 | 1200 | 1200 | 1200 | 500 | 1000 | 1200 | 1200 | 1000 |
| Young's modulus of the outermost coating layer (MPa) | 858 | 920 | 823 | 717 | 630 | 765 | 826 | 497 | 410 | 496 | 460 | 420 |
| Coefficient of kinetic friction | 0.37 | 0.45 | 0.59 | 0.31 | 0.43 | 0.26 | 0.18 | 0.80 | 0.87 | 0.40 | 0.55 | 0.32 |
| Value at the right of relational expression (a) | 0.57 | 0.54 | 0.59 | 0.65 | 0.70 | 0.62 | 0.59 | 0.80 | 0.89 | 0.80 | 0.84 | 0.88 |
| Value at the right of relational expression (b) | 0.15 | 0.14 | 0.16 | 0.19 | 0.22 | 0.18 | 0.16 | 0.28 | 0.33 | 0.28 | 0.30 | 0.32 |
| The rate of occurrence of OTDR discontinuity (counts/250 km) | 1 | 4 | 5 | 0 | 2 | 0 | 0 | 5 | 4 | 0 | 2 | 0 |

| | Comparison example | | | |
|---|---|---|---|---|
| | 1 | 2 | 3 | 4 |
| The first coating layer resin composition | UV resin 1 | | | |
| The second coating layer resin composition | UV resin 2 | UV resin 4 | UV resin 7 | UV resin 10 |
| Oxygen concentration of curing the second coating layer (%) | 0.1 | 0.8 | 0.6 | 0.8 |
| Drawing speed (m/min) | 1000 | 1500 | 300 | 1000 |
| Young's modulus of the outermost coating layer (MPa) | 936 | 650 | 450 | 450 |
| Coefficient of kinetic friction | 0.56 | 0.15 | 0.89 | 0.15 |
| Value at the right of relational expression (a) | 0.53 | 0.69 | 0.85 | 0.85 |
| Value at the right of relational expression (b) | 0.13 | 0.22 | 0.30 | 0.30 |
| The rate of occurrence of OTDR discontinuity (counts/250 km) | 18 | not measurable | 23 | not measurable |

Figure 6:
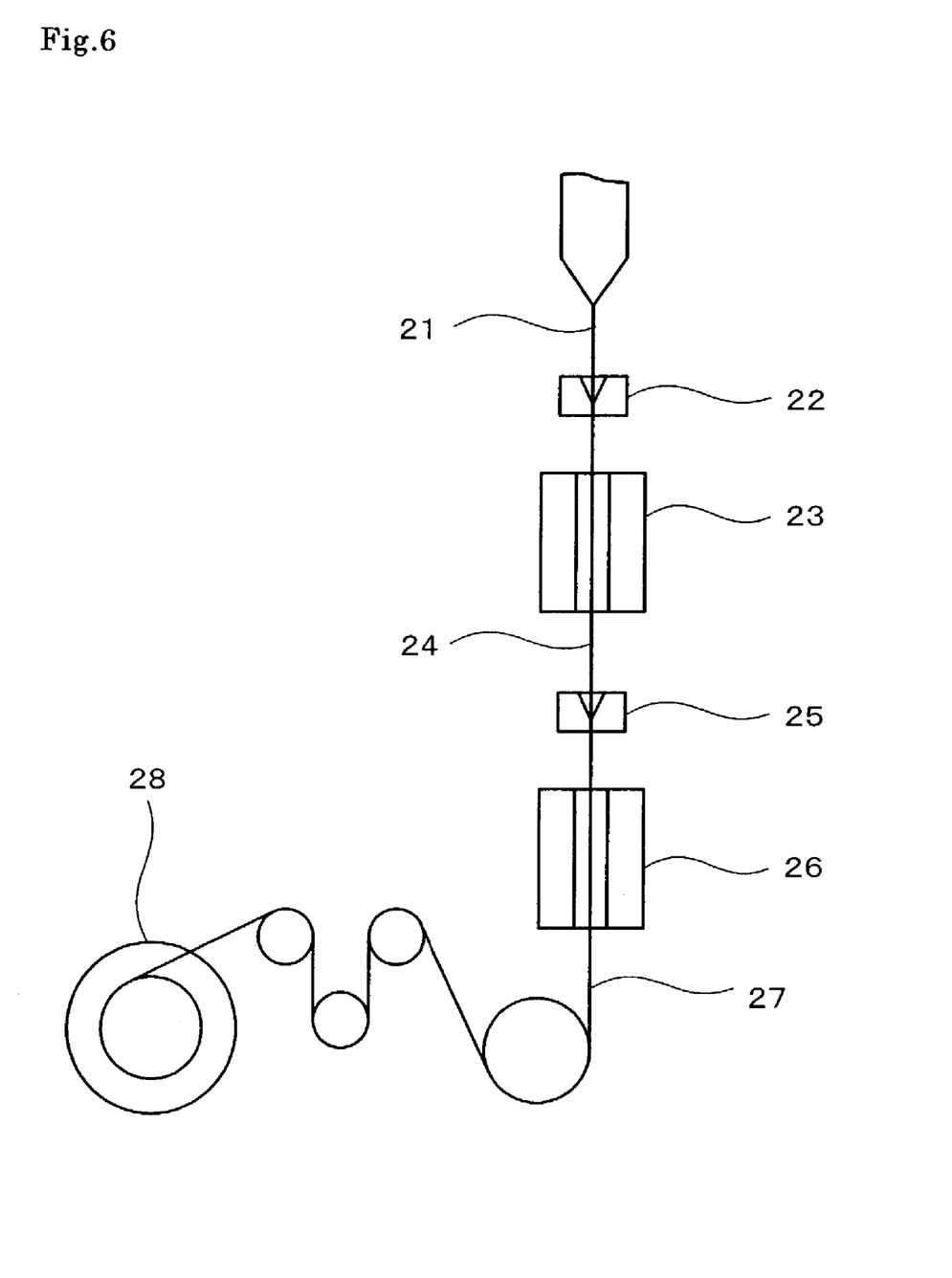
FIG. 6 is the figure where the outline chart of the process of manufacture of optical fiber (method of the drawing) is shown.

Optical fiber was manufactured by the method shown in FIG. 6.

Coating UV resin liquid 1 on the drawn bare optical fiber 21 of about 125 μm outer diameter by passing it through the die 22 and curing it by irradiating UV rays continuously in the UV irradiation room 23, the first coating layer 24 of about 195 μm outer diameter was formed. Then, coating UV resin liquid 2–10 on this first coating layer by passing it through the die 25 and curing it by irradiating UV rays continuously in the UV irradiation room 26, the second coating layer 27 of about 245 μm outer diameter was formed and the optical fiber was wound up to the bobbin 28.

As a result, optical fibers of example 1–12 and comparison example 1–4 shown in Table 2 were obtained. In these cases, the amount of total dose of the UV rays irradiated to the optical fiber was about 100 mJ/cm².

Also, the drawing speed and the oxygen concentration of the curing atmosphere of a second coating layer of each optical fiber were collectively indicated in Table 2.

The concentration of oxygen of the curing atmosphere of the second UV coating layer was adjusted by controlling the concentration of oxygen in UV irradiation room 26.

Optical fiber of 250 km was made and wound up to a large-sized bobbin, and it was rewound to a small-sized bobbin per 25 km by a tension of 50 gf.

The best conditions of the measurement of the coefficient of kinetic friction are determined by using this rewound optical fiber and the coefficient of kinetic friction was measured by employing this condition. And the Young's modulus of the outermost coating layer (in this case, it was the second coating layer), the coefficient of kinetic friction, and the transmission loss (by OTDR) of each optical fiber were measured. Moreover, the rate of occurrence of discontinuity was investigated from the measurement result of OTDR. The method is explained below.

Figure 2:
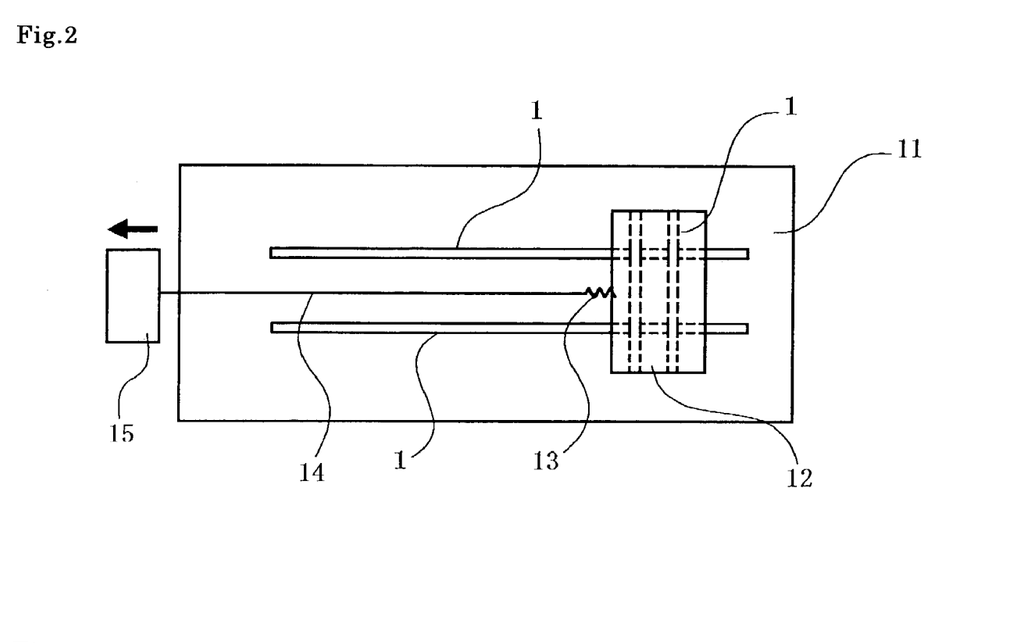
FIG. 2 is the top view of the measuring method of the coefficient of kinetic friction of a preferred embodiment of the present invention.
Figure 3:
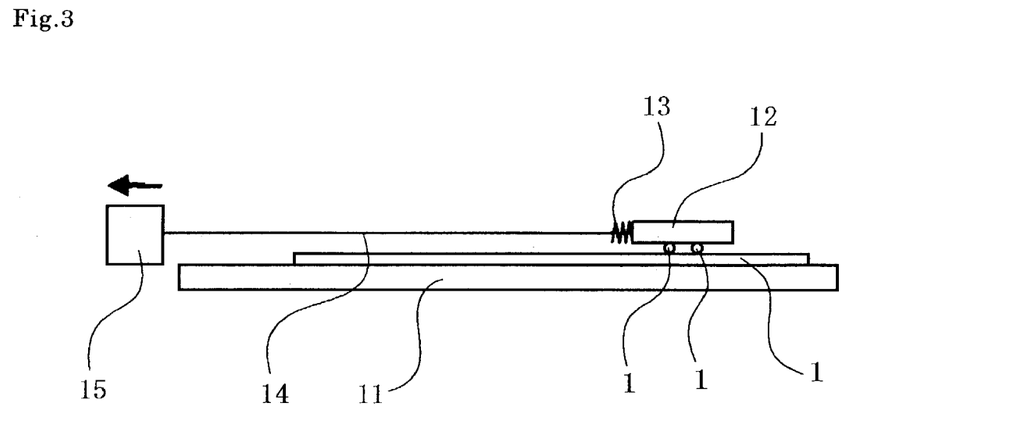
FIG. 3 is the side view of the measuring method of the coefficient of kinetic friction of a preferred embodiment of the present invention.

1) Examination of the Measurement Conditions of the Coefficient of Kinetic Friction of Optical Fiber The coefficient of kinetic friction of the optical fibers of examples 1 to 12 and comparison examples 1 to 4 was measured with the device shown in FIG. 2 and FIG. 3. FIG. 2 is the top view of the device, and FIG. 3 is the side view of the device.

Concretely, two optical fibers 1 are fixed parallel to each other on a plane of the horizontal fixed table 11 and on the bottom of the sled 12, and the sled 12 loaded on the fixed table 11 in such a way that each optical fibers 1 cross right-angled and contact as shown in FIG. 2 and FIG. 3.

Afterwards, the sled 12 was connected to the loading cell 15 by the spring 13 and pulling string 14, and the kinetic frictional force caused when a sled 12 is moved to the direction of the arrow of FIG. 2 and FIG. 3 is measured.

At this time, the standard load of spring was 0.49N and the spring constant was 0.047N/mm. The load cell 15 was stopped at the position which moved the sled 12 of 100 mm, and what averaged the friction force under movement except the force at the time of a move start from the obtained friction force profile was made into a kinetic friction force.

In addition, the value of a kinetic frictional force per weight of the sled was assumed as a coefficient of kinetic friction.

Different tensile speeds of moving the sled (tensile speed of the load cell) in the range of 50 to 700 mm/min and different weights of the sled along with the optical fiber fixed to the bottom in the range of 50 to 120 gf were employed, and the best measurement condition was investigated.

The measurement was done ten times per each optical fiber, and to judge the variations in the ten measurements, the value in which the standard deviation was divided by the average (thereafter, it is shown standard deviation/average), was calculated. Larger standard deviation/average implies that the variations of measurements are larger and the reliability is lower, and smaller standard deviation/average implies that the variations of the measurements are smaller and reliability is higher. Table 3 shows the result.

the weight is bigger than 100 gf, it obviously begins to deform the optical fiber and hence more than 60 gf of the weight of the sled and less than 110 gf is desirable.

When the tensile speed is lower than 100 mm/min, since the movement of the sled becomes discontinuous and could not keep a constant speed, the kinetic friction force cannot be measured, and when the tensile speed is higher than 500 mm/min, variations of the measured coefficient of kinetic friction are large and hence, the tensile speed of moving the sled of more than 100 mm/min and less than 500 mm/min is desirable.

TABLE 3

| Measurement No. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Sumple No. | | | | | | | Example 1 | | | | | | | | Example 2 | Example 3 |
| Measurement condition | Pulling speed (mm/min) | 50 | 100 | 200 | 300 | 400 | 500 | 700 | 300 | 300 | 300 | 300 | 300 | 300 | 300 | 300 |
| | Weight of the sled (gf) | 85 | 85 | 85 | 85 | 85 | 85 | 85 | 50 | 60 | 70 | 100 | 110 | 120 | 85 | 85 |
| Coefficient of kinetic friction | Average | not measurable | 0.36 | 0.37 | 0.37 | 0.36 | 0.36 | 0.38 | 0.35 | 0.36 | 0.37 | 0.37 | 0.37 | not measurable | 0.45 | 0.59 |
| | Standard deviation/Average | | 0.05 | 0.02 | 0.02 | 0.02 | 0.04 | 0.22 | 0.19 | 0.05 | 0.03 | 0.03 | 0.05 | | 0.03 | 0.02 |

| Measurement No. | | 16 | 17 | 18 | 19 | 20 | 21 | 22 | 23 | 24 | 25 |
|---|---|---|---|---|---|---|---|---|---|---|---|
| Sumple No. | | | | Example 4 | | | Example 5 | Example 6 | Example 7 | Example 8 | Example 9 |
| Measurement condition | Pulling speed (mm/min) | 100 | 200 | 300 | 400 | 500 | 300 | 300 | 300 | 300 | 300 |
| | Weight of the sled (gf) | 60 | 70 | 85 | 100 | 110 | 85 | 85 | 85 | 85 | 85 |
| Coefficient of kinetic friction | Average | 0.31 | 0.32 | 0.31 | 0.31 | 0.32 | 0.43 | 0.26 | 0.18 | 0.80 | 0.87 |
| | Standard deviation/Average | 0.06 | 0.03 | 0.02 | 0.03 | 0.06 | 0.02 | 0.03 | 0.03 | 0.02 | 0.02 |

| Measurement No. | | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|
| Sumple No. | | | | Example 10 | | | Example 11 | Example 12 | | | Comparison Example 1 | | | | | Comparison Example 2 |
| Measurement condition | Pulling speed (mm/min) | 100 | 200 | 300 | 400 | 500 | 300 | 300 | 50 | 100 | 200 | 300 | 400 | 500 | 700 | 300 |
| | Weight of the sled (gf) | 110 | 100 | 85 | 70 | 60 | 85 | 85 | 50 | 70 | 70 | 85 | 100 | 110 | 120 | 85 |
| Coefficient of kinetic friction | Average | 0.41 | 0.39 | 0.40 | 0.40 | 0.40 | 0.55 | 0.32 | not measurable | 0.55 | 0.56 | 0.56 | 0.55 | 0.57 | 0.58 | 0.15 |
| | Standard deviation/Average | 0.06 | 0.02 | 0.02 | 0.03 | 0.05 | 0.03 | 0.02 | | 0.06 | 0.02 | 0.02 | 0.03 | 0.06 | 0.28 | 0.03 |

| Measurement No. | | 41 | 42 | 43 | 44 | 45 |
|---|---|---|---|---|---|---|
| Sumple No. | | | Comparison Example 3 | | | Comparison Example 4 |
| Measurement condition | Pulling speed (mm/min) | 200 | 300 | 400 | 500 | 300 |
| | Weight of the sled (gf) | 110 | 85 | 60 | 100 | 85 |
| Coefficient of kinetic friction | Average | 0.89 | 0.89 | 0.90 | 0.90 | 0.15 |
| | Standard deviation/Average | 0.05 | 0.02 | 0.05 | 0.05 | 0.02 |

From these results, it is clear that the standard deviation/average of the measured coefficient of kinetic friction is small and reliability is high when the tensile speed of moving the sled is 100~500 mm/min, and weight of the sled is 60~110 gf. Especially, standard deviation/average of the measured coefficient of kinetic friction is very small and reliability is highest when the tensile speed of moving the sled is 200~400 mm/min, and weight of the sled is 70~100 gf.

When the weight is smaller than 60 gf, variations of the measured coefficient of kinetic friction are large, and when 2) Measurement of Coefficient of Kinetic Friction The coefficients of kinetic friction of optical fiber of example 1–12 and comparison example 1–4 was measured again by using the above-mentioned best measurement condition.

Among the obtained best measurement conditions (the tensile speed: 100~500 mm/min and weight of the sled: 60~110 gf), the tensile speed of 300 mm/min and weight of the sled of 85 gf has been applied at this time.

Moreover, other measurement conditions were also set at the conditions denoted earlier.

3) Measurement of Young's Modulus of the Outermost Coating Layer

Figure 1:
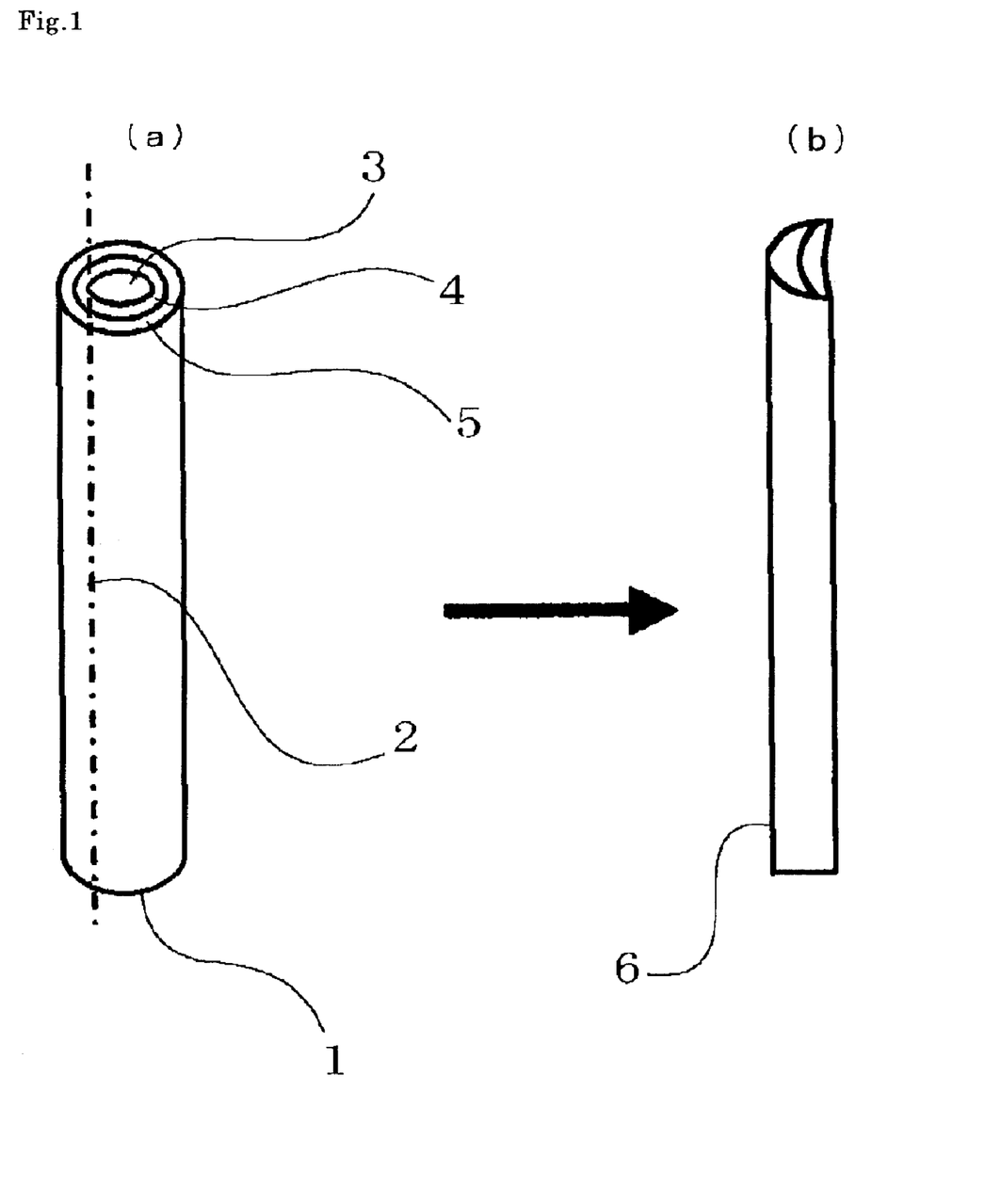
FIG. 1(a) is the oblique perspective figure of the entire optical fiber and FIG. 1(b) is the oblique perspective figure of the sliced portion in the coating layer part of the optical fiber of the present invention.

Optical fiber 1 was sliced along the line (slice line 2) along the interface between the bare optical fiber 3 and the first coating layer 4 as shown in FIG. 1, and the slice splinter 6, the coating layer part as shown in FIG. 1(b), was obtained. 5 is the second coating layer. The tensile test was done on the condition of 23° C., tensile speed of 1 mm/min and the distance of 25 mm between gauge lines, and the Young's modulus for this slice splinter 6 was calculated from tensile strength at 2.5% distortion. The cross-sectional area of the slice splinter was measured by the microscope.

4) Investigation of the Rate of Occurrence of Discontinuity

Each ten optical fiber wound up to the small bobbin per 25 km was measured by OTDR, and the rate of occurrence of the discontinuity was investigated. In the attenuation curve, among parts where the loss variation like the step occurred, when there was a difference of 0.03 dB or more of the average value of loss between parts separated by a length of 100 m, it was counted as one discontinuity.

These results are collectively shown in Table 2.

As shown in Table 2, rate of occurrences of the discontinuity of optical fibers 1–12 of the examples of the present invention are 5 counts/250 km or less and has been obviously lowered compared to the rate of occurrences of the discontinuity of comparison example 1–4 which is 18 counts/250 km or more. Moreover, the comparison example 2 and 4 could not be measured owing to the generation of the rolling collapse.

Figure 4:
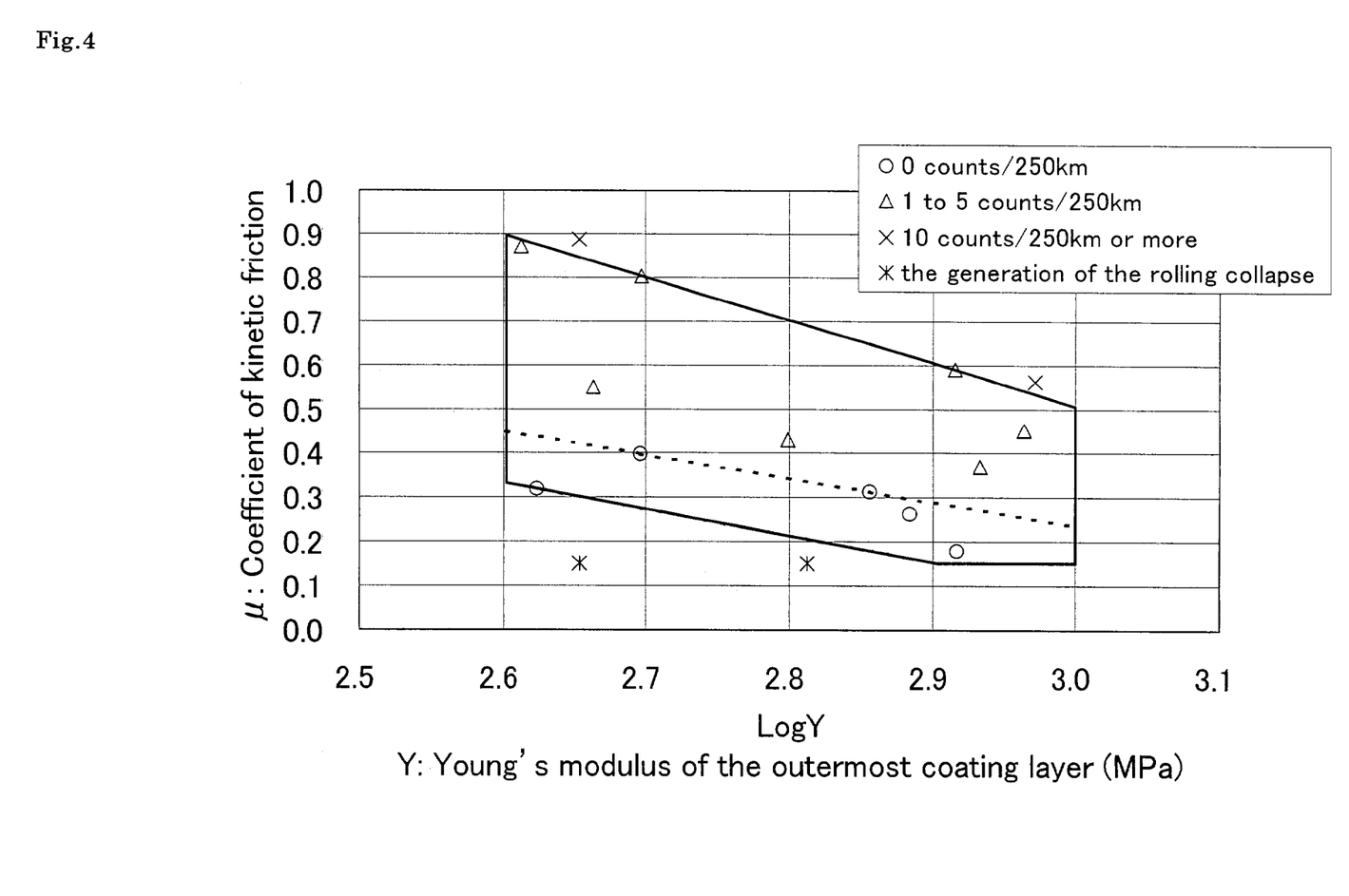
FIG. 4 is a graph where the relation between the Young's modulus of the outermost coating layer of the optical fiber and the coefficient of kinetic friction is shown.

Moreover, the relation between the Young's modulus and the coefficient of kinetic friction in the outermost coating layer of optical fibers of example 1–12 and comparison example 1–4 were displayed in FIG. 4. In FIG. 4, the rate of occurrences of the discontinuity of 0 counts/250 km was indicated as ○, 1–5 counts/250 km was indicated as Δ, 10 counts/250 km or more was indicated as x, and not possible to measure owing to the generation of the rolling collapse was indicated as *.

As a result, in the optical fibers enclosed within the solid line of FIG. 4, the rate of occurrences of the discontinuity are in the range of 5 counts/250 km or less, and the rate of occurrence of the discontinuity of any optical fibers is low.

In this range, the Young's modulus of the outermost coating layers are 400–1000 MPa and the coefficients of kinetic friction are 0.15 or more, and coefficients of kinetic friction μ satisfy the following relationships (a) and (b).

$$\mu \leq -0.9822 \log Y + 3.45156 \quad (a)$$

$$\mu \geq -0.5418 \log Y + 1.74128 \quad (b)$$

Beyond the limits of above-mentioned relationship (a), μ>−0.9822 Log Y+3.45156, the rate of occurrences of the discontinuity were high, 10 counts/250 km or more.

Since the tack of the surface of the optical fiber increases, the generation of the discontinuity originating from it have also increased.

Beyond the limits of above-mentioned relationship (b), μ<−0.5418 Log Y+1.74128, owing to the frequent occurrence of rolling collapse, the measurement of the discontinuity was not possible.

In addition, optical fibers within the range enclosed in the broken line in FIG. 4, wherein the rates of occurrences of the discontinuity were 0 counts/250 km, are most suitable.

In this range the Young's modulus of the outermost layers are 400–1000MPa and the coefficients of kinetic friction are 0.15 or more, and coefficients of kinetic friction μ satisfy the following relational expressions (b) and (c).

$$\mu \geq -0.5418 \log Y + 1.74128 \quad (b)$$

$$\mu \leq -0.5418 \log Y + 1.85912 \quad (c).$$

The rate of occurrences of the discontinuity is related to the Young's modulus of the outermost coating layer in addition to the coefficient of kinetic friction of optical fiber, in the above mentioned manner.

That is, when the Young's modulus Y of the outermost coating layer and the coefficient of kinetic friction μ at the outer most resin coating layer satisfy the above-mentioned relationships (a) and (b), the rate of occurrences of the discontinuity can be suppressed to be low. Moreover, when the above-mentioned relationships (b) and (c) are satisfied, it is more desirable.

Previously, prior to this work, though the relation between the rate of occurrences of the discontinuity and the coefficient of kinetic friction of the outermost coating layer had been investigated, a clear relationship was not obtained.

This is because, when the optical fibers touched mutually, the contact parts of the fiber collapsed and the contact area changed. The measured coefficient of kinetic friction received the influence of the Young's modulus or hardness of the outermost coating resin layer greatly and hence the coefficient of kinetic friction cannot be measured accurately.

According to relationships (a) and (b), when the Young's Modulus is small, the coefficient of kinetic friction is required to be high because, when the Young's Modulus is small, the hardness of the surface is small, the optical fiber collapses and the contact area increases.

The present invention is not the one especially limited to the above-mentioned manufacturing process.

Moreover, though the method of measuring the coefficient of kinetic friction of optical fiber of the present invention is not especially limited to the shape of the sled, material, and the method of fixing optical fiber, it is necessary to fix properly in a such a way that the optical fiber does not come off and shift while measuring it.

An optical fiber of the present invention has an excellent effect that it is possible to decrease the rate of occurrences of the discontinuity. Therefore, the workload of the rewind process is reduced.

Moreover, the coefficient of kinetic friction with high reliability is obtained by the method of the present invention.

What is claimed is:

1. An optical fiber comprising a bare optical fiber and one or plural coating layers on the bare optical fiber, wherein Y, the Young's modulus of the outermost coating layer, is in the range of 400 to 1000 and μ, a coefficient of kinetic friction which occurs between the outermost coating layers which have been organized respectively in two said optical fibers, is equal to or larger than 0.15, and further satisfying the following formulas (a) and (b);

$$\mu \leq -0.9822 \log Y + 3.45156 \quad (a)$$

$$\mu \geq -0.5418 \log Y + 1.74128 \quad (b),$$

wherein the unit of Y is MPa.

2. The optical fiber according to claim 1, wherein μ further satisfies the following formula (c);

$$\mu \leq -0.5418 \log Y + 1.85912 \quad (c).$$

3. The optical fiber according to claim 1, wherein the bare optical fiber is a silica-based optical fiber.

4. The optical fiber according to claim 1 wherein the bare optical fiber has a diameter of 125 μm±5 μm.

5. The optical fiber according to claim 1 including a first coating layer and an outermost coating layer as the coating layers, wherein Young's modulus of the first coating layer is equal to or less than 2 MPa.

6. The method of measuring the coefficient of kinetic friction of optical fiber that is to measure the kinetic frictional force caused by the movement of a sled on a fixed horizontal table under the condition that two optical fibers are fixed parallel to each other on the horizontal fixed table and on the bottom of the sled and the sled is loaded on the fixed table so that each optical fiber cross right-angled, and they contact; wherein a weight of the sled along the optical fiber fixed to bottom of sled is more than 60 gf and less than 110 gf, and tensile speed of moving the sled is more than 100 mm/min and less than 500 mm/min.

7. The method of measuring the coefficient of kinetic friction of optical fiber according to claim 6 wherein weight of sled is more than 70 gf and less than 110 gf.

8. The method of measuring the coefficient of kinetic friction of optical fiber according to claim 6 wherein tensile speed of moving the sled is more than 200 mm/min and less than 500 mm/min.

9. An optical fiber comprising a bare optical fiber and one or plural coating layers on the bare optical fiber, wherein Y, the Young's modulus of the outermost coating layer, is in the range of 400 to 1000 and $\mu$, a coefficient of kinetic friction which occurs between the outermost coating layers, is equal to or larger than 0.15, and further satisfying the following formulas (a) and (b);

$$\mu \leq -0.9822 \, \text{Log} \, Y + 3.45156 \quad \text{(a)}$$

$$\mu \geq -0.5418 \, \text{Log} \, Y + 1.74128 \quad \text{(b),}$$

wherein the unit of Y is MPa wherein a method of measuring the coefficient of kinetic friction of optical fiber that is to measure the kinetic frictional force caused by the movement of a sled on a fixed horizontal table under the condition that two optical fibers are fixed parallel to each other on the horizontal fixed table and on the bottom of the sled and the sled is loaded on the fixed table so that each optical fiber cross right-angled, and they contact; wherein a weight of the sled along with the optical fiber fixed to bottom of sled is more than 60 gf and less than 110 gf, and tensile speed of moving the sled is more than 100 mm/min and less than 500 mm/min.

* * * * *